(No Model.)

P. J. KERN.

WAGON SEAT.

No. 300,611. Patented June 17, 1884.

WITNESSES
Villette Anderson.
John T. Morrow.

INVENTOR
Phaon J. Kern,
by Anderson & Smith
his ATTORNEYS

UNITED STATES PATENT OFFICE.

PHAON J. KERN, OF FRANKFORT, INDIANA.

WAGON-SEAT.

SPECIFICATION forming part of Letters Patent No. 300,611, dated June 17, 1884.

Application filed March 26, 1884. (No model.)

*To all whom it may concern:*

Be it known that I, PHAON J. KERN, a citizen of the United States, residing at Frankfort, in the county of Clinton and State of Indiana, have invented certain new and useful Improvements in Wagon-Seats; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
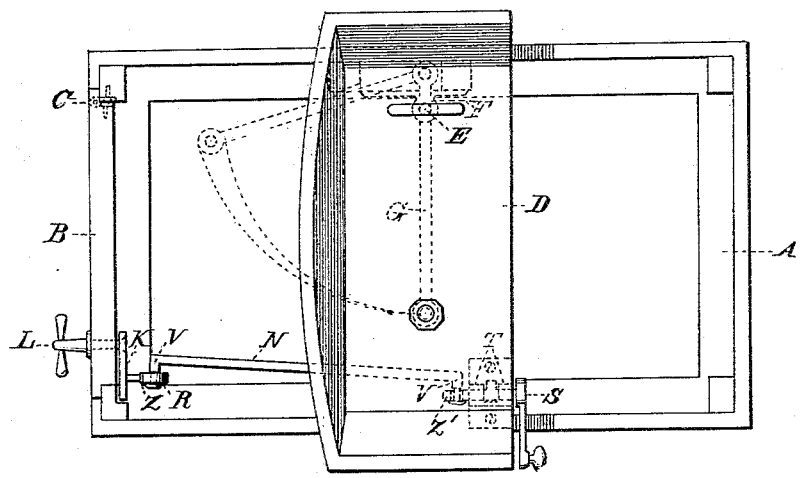
Figure 2:
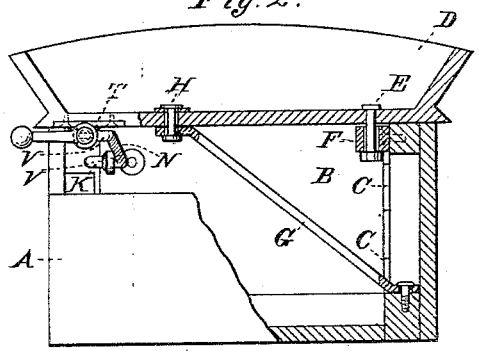
Figure 3:
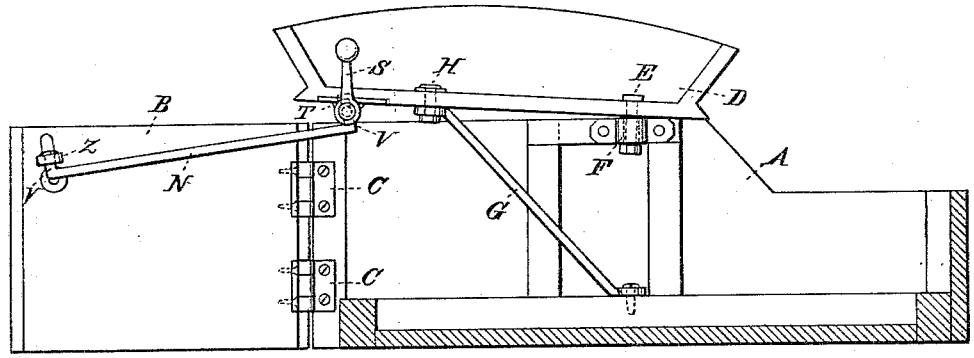

Figure 1 of the drawings is a representation of this invention, and is a top view. Fig. 2 is partly a front view and partly a sectional view. Fig. 3 is a vertical section taken through the length of the wagon, and shows the seat and gate thrown back.

This invention has relation to vehicles having horizontally-swinging seats; and it consists in the construction and novel arrangement of devices, as hereinafter set forth, and pointed out in the appended claims.

In the accompanying drawings, the letter A designates the body of a vehicle, having at its rear end a door or gate, B, swinging upon hinges at C.

D represents the seat of the vehicle, which is provided with a pivot at E, seated in the bearing F, which is secured to the same side of the vehicle on which the bar is hinged.

G represents an angular brace-bar, which is pivoted to the sill of the body under the seat-pivot, and a little nearer the side wall of the vehicle, so that a line connecting the centers of the seat-pivot and the brace-pivot would be oblique. The brace extends obliquely to the free end of the seat, to the bottom of which it is secured by a bolt, as at H.

K represents the gate-latch, which is seated in a bearing in the gate, and is operated by a handle, L.

N is a connecting-bar, which extends from the gate-latch to which it is pivoted, as at R, to the crank-handle S, which is pivoted in bearings T on the seat. The pivoted lugs V at the ends of the connecting-bar are at right angles to the main portion of the bar, and are pivoted, respectively, in the bearing-lug Z, which is formed on the latch, and in a bearing, Z', on the inner or seat handle. By means of this double-jointed connecting-bar the end-gate of the vehicle and its swinging seat are so joined together that when the gate is opened the seat will be at the same time swung rearwardly to the side of the vehicle, and when the gate is closed the seat will be swung forward in its proper transverse position. The gate can be latched or unlatched by operating the outer end, or by working the inner handle arranged on the seat. In either case the latch would be turned in the proper manner. When the seat is swung to the rear, it is designed to prevent it from striking the gate or paneling to injure the same; and for this purpose the pivot of the brace under the seat is arranged eccentrically with reference to the axis of the seat-pivot, so that when the seat is swung to the rear it will at the same time be raised a little at its free end, and when swung back into position it will fall to its bearing at the side of the body of the vehicle.

Having thus described this invention, what I claim, and desire to secure by Letters Patent, is—

1. In a vehicle, a horizontally-swinging seat having its pivot near one end, and an eccentric brace extending obliquely downward from its free end, and pivoted to the sill of the vehicle eccentrically with reference to the seat-pivot, substantially as specified.

2. In a vehicle, the combination, with a horizontal swinging seat and hinged gate, both pivoted on the same side of the vehicle, of the outer latch-handle having a bearing in the gate, the inner latch-handle having a bearing in the seat, and a connecting-rod pivoted to the gate-latch, and the inner handle connecting the seat and gate, substantially as specified.

3. In a vehicle, the combination, with the swinging seat having an oblique eccentrically-pivoted brace and a hinged end-gate, of the inner latch-handle, the outer latch-handle, the latch, and the connecting-rod having angular pivot-lugs respectively connected to bearings on the latch and on the inner or seat handle, substantially as specified.

In testimony whereof I affix my signature in presence of two witnesses.

PHAON J. KERN.

Witnesses:
 WILLIAM R. HINES,
 ERI T. MINER.